United States Patent
Larsen et al.

[11] Patent Number: 5,379,751
[45] Date of Patent: Jan. 10, 1995

[54] INDUCER COLLECTOR BOX SEAL FOR INDUCTION CONDENSER FURNACE

[75] Inventors: Michael J. Larsen, Danville; Timothy J. Waterman, Carmel; Larry D. Rieke, Zionsville, all of Ind.

[73] Assignee: Carrier Corporation, Syracuse, N.Y.

[21] Appl. No.: 170,016

[22] Filed: Dec. 20, 1993

[51] Int. Cl.⁶ ............................................. F24H 3/00
[52] U.S. Cl. ............................ 126/110 R; 126/110 A; 126/116 R
[58] Field of Search ............. 126/110 R, 99 R, 110 A, 126/110 E, 110 D, 110 C, 116 R

[56] References Cited

U.S. PATENT DOCUMENTS

| | | | |
|---|---|---|---|
| 2,446,744 | 8/1948 | Delancey | 431/265 X |
| 3,661,140 | 5/1972 | Raleigh | 126/110 R |
| 4,312,321 | 1/1982 | Skow | 126/110 R X |
| 4,336,791 | 6/1982 | Kitchen | 126/110 R |
| 4,905,895 | 3/1990 | Grebe et al. | 126/110 B X |
| 4,962,749 | 10/1990 | Dempsey et al. | 126/110 E X |

Primary Examiner—Carl D. Price

[57] ABSTRACT

A pair of sealing skirts join the inducer to the collector box of a condenser induction furnace, and accommodate offset in positions of the inducer inlet opening and the collector box outlet port. The two mating skirts are congruent and of generally triangular shape. A ridge or lip of one fits a groove on the other to form an airtight gasketless seal.

6 Claims, 3 Drawing Sheets

INDUCER COLLECTOR BOX SEAL FOR INDUCTION CONDENSER FURNACE

This invention relates to furnaces, and more especially to induction type condensing gas furnaces of the type in which an inducer blower removes combustion product gases from an outlet of a condenser heat exchanger stage. The invention is more specifically directed to a seal assembly that joins the inlet of the inducer to the outlet of the condenser heat exchanger stage.

Induction-type gas furnaces typically include a primary heat exchanger into which flame from one or more burner units is directed. A circulation air blower moves circulation room air over the heat exchanger, to produce heated air that is returned to a comfort space. The primary heat exchanger is followed by a secondary or condensing heat exchanger which transfers additional heat to the circulation air, and condenses some of the moisture in the combustion products. The secondary heat exchanger is typically in the form of several parallel condenser cells, and these exhaust into a common collector box that extends the width of the secondary heat exchanger. The collector box has an exhaust or vent gas outlet disposed centrally thereon.

The inducer has an inlet opening at its center and means are provided to join the inducer inlet to the collector box outlet. The inducer draws the vent gas from the collector box and directs it out through a vent pipe to the outside environment.

Typically, the inducer includes a centrifugal fan or blower and stands significantly taller than the corresponding collector box. Because each of these has its respective inlet or outlet centrally disposed thereon, the inducer inlet is positioned above the collector box outlet, and the coupling means that connect the outlet and inlet must accommodate this mismatch of position. The coupling means also must seal against leakage of flue gases, and must be airtight and watertight. Moreover, airflow considerations and space considerations within the furnace dictate that the flow of vent gases between the collector box and the inducer must take place within a small space, e.g. one inch across.

OBJECTS AND SUMMARY OF THE INVENTION

It is an object of this invention to provide a seal structure that joins an inducer and a collector box, and that resolves the problems mentioned just above.

It is a more specific object to provide a seal structure that permits even, adequate airflow between the collector box and the inducer and accommodates the difference in vertical position as between the collector box outlet and the inducer inlet.

It is a further object to provide a seal structure that creates an airtight seal without a cut gasket.

In accordance with an aspect of the present invention, a seal structure is provided in the form of a first seal skirt formed around the outlet of the collector box, and a mating seal skirt formed around the inlet of the inducer fan. These skirts are continuous around the respective outlet and inlet, and are congruent, that is, they have the same shape and size so that they mate onto one another. In a preferred embodiment these skirts are generally triangular, with rounded corners. The sealing skirt on the collector box front wall has a lower wall disposed alongside a lower edge of the outlet, which in this case is a transversely elongated opening at the center of the collector box front wall. The generally triangular second sealing skirt has a lower side wall that mates in register with the lower wall of the first skirt and an upper apex opposite the lower side wall. The inlet for the inducer fan is formed within the skirt with one side adjacent the upper apex.

Also in a preferred mode, one of the skirts has a male lip that projects forward from the top edge and continues around the entire skirt. The other of the skirts has a mating, continuous female groove formed in its tip edge to receive the male lip of the one skirt. The lip and groove mate to form a gasketless seal, i.e., a seal that does not require a discrete cut gasket. Instead, a self-forming gasket is formed of a sealant compound in the groove. This provides an air-tight water-tight structure.

The above and many other objects, features and advantages of this invention will present themselves to persons skilled in the art upon reading the ensuing description of a preferred embodiment, which should be read in conjunction with the accompanying Drawing.

DETAILED DESCRIPTION OF A PREFERRED EMBODIMENT

Figure 1:
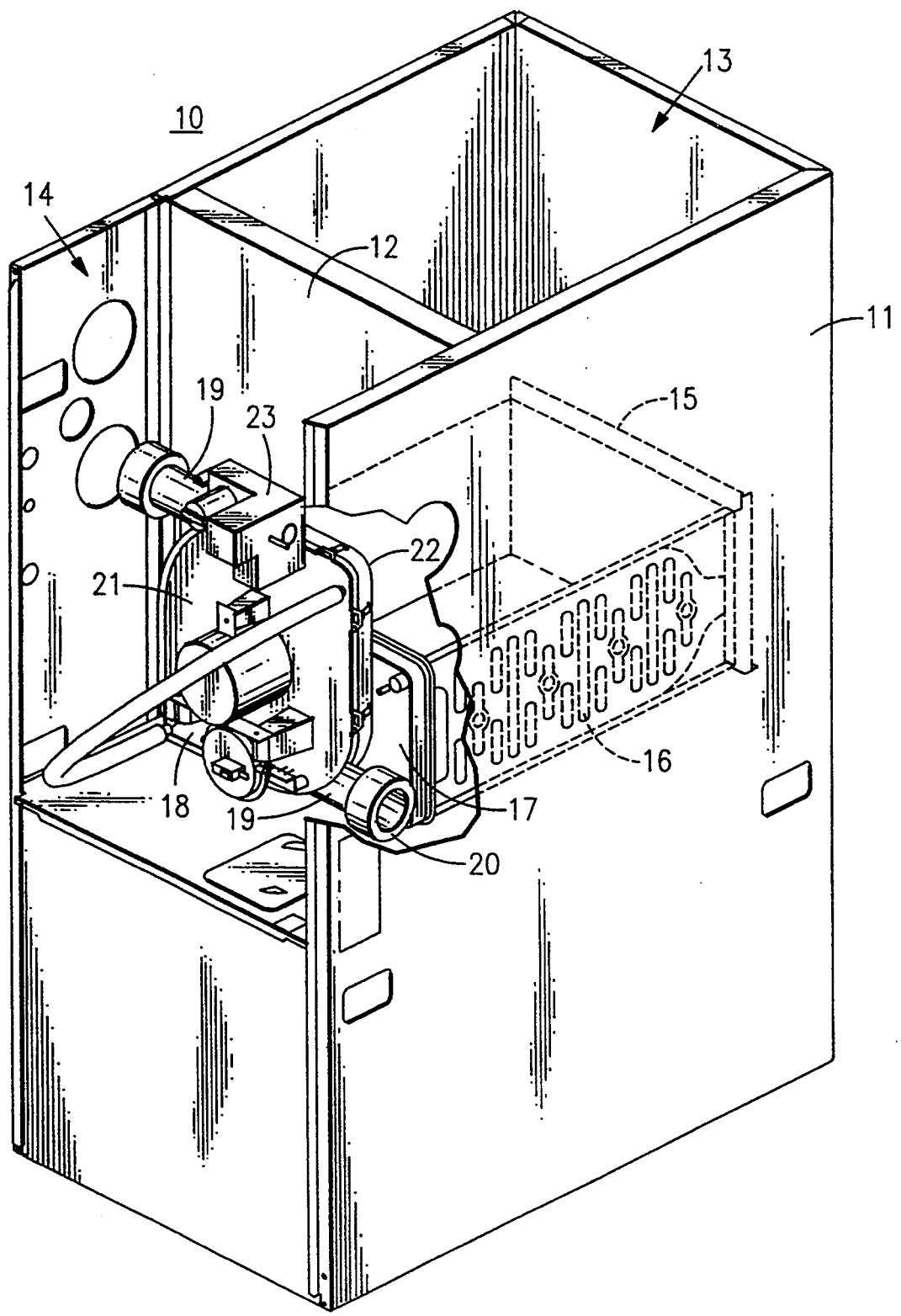
FIG. 1 is a partial cutaway perspective view of a furnace, featuring the condensing heat exchanger and inducer fan joined in accordance with one embodiment of this invention.
Figure 2:
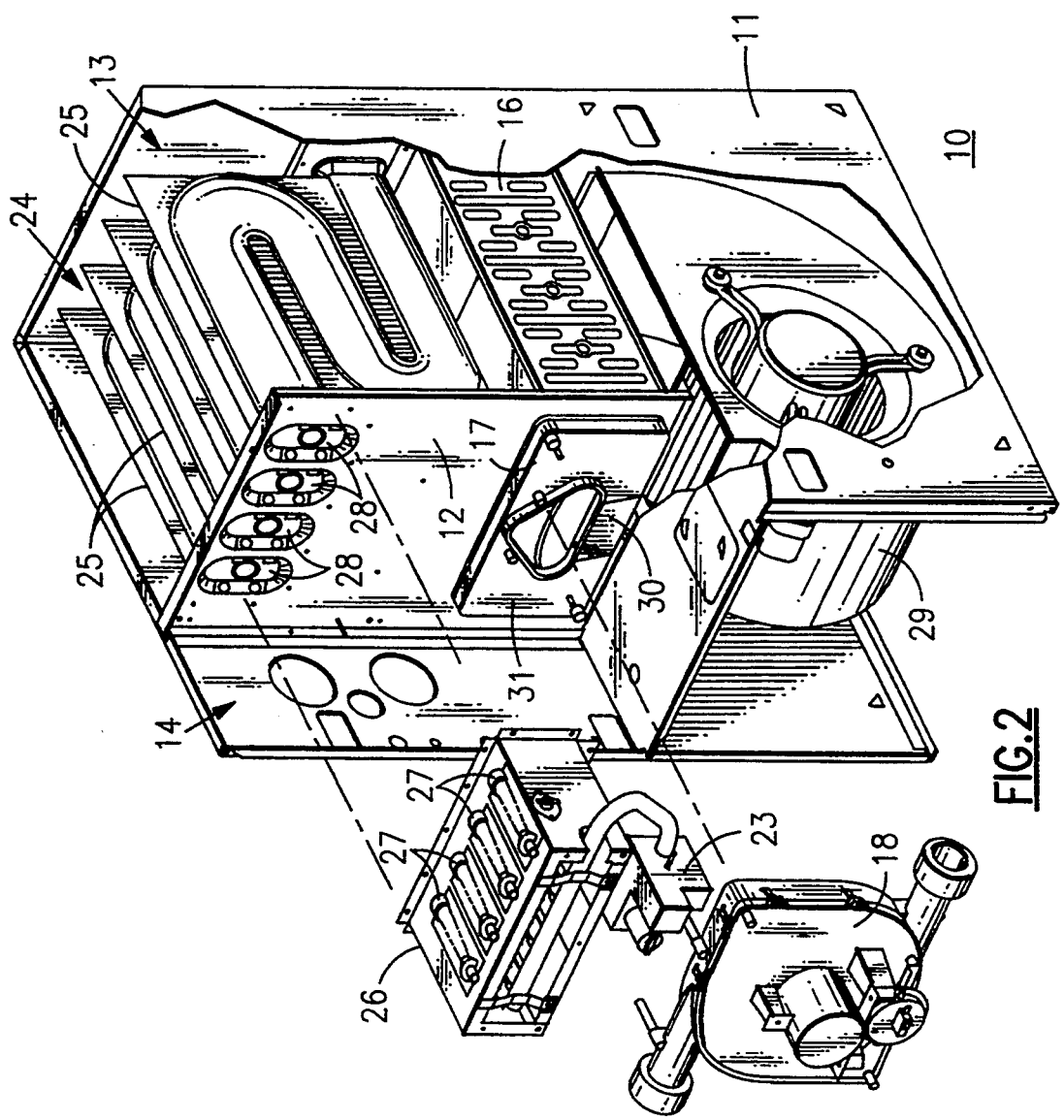
FIG. 2 is a exploded perspective view of the furnace embodying the features of this invention.

Referring now to the Drawing and initially to FIGS. 1 and 2, a forced air gas furnace 10 is here shown as a so-called multi-poise condensing furnace. These are described in more detail in copending U.S. patent application Ser. No. 08/089,697, assigned to the assignee of this invention. These furnaces can be installed in an erect or upflow configuration, an inverted or downflow configuration, a horizontal right-flow configuration, or a horizontal left-flow configuration. These furnaces include design feature which permit efficient operation in any of the four poises or orientations. That is, in addition to ensuring that comfort space air is moved efficiently through the furnace heat exchanger and returned to the comfort space, there must be adequate drainage of condensation from the furnace, and the vent gases must be removed and impelled through the inducer to the vent pipe and thence out into the exterior environment.

To accommodate the multi-poise capability of this furnace, the inducer has two discharge ports. Depending on the installation orientation, one of these ports is coupled to the exhaust or vent pipe, and the other one is capped with an air-tight seal.

The condenser stage of the furnace heat exchanger has a front plenum or collector box into which passes condensed moisture from the combustion products and also all remaining gaseous combustion products. A vent gas port is formed at the center of the collector box front wall. Two or more condensate drain nipples are provided, disposed at corners of the collector box to drain off the condensate from the condensing heat exchanger. Depending on the poise selected, one or another of these drain nipples will be lowermost and this nipple is connected to a drain table. Any remaining drain nipples are capped off.

The inducer includes a centrifugal fan contained within an airtight housing, with an intake port situated centrally on the wall of the housing that faces the collector box of the condensing heat exchanger. The inducer stands somewhat taller than the collector box, and so the intake port of the inducer is positioned somewhat above the vent gas port of the collector box (considered in the upright or upflow poise).

With respect to the furnace 10 illustrated here, there is a cabinet or housing 11 having a vertical cell panel 12 that defines a heat exchanger space 13 behind the cell panel 12 and an equipment space 14 in front of the cell panel 12.

As shown in FIG. 2, a heat exchanger element 15 (here the condenser stage) is shown with one condenser 16 illustrated of the several condensers arranged in parallel. The condensers feed into a collector box 17 that is disposed at the front of the element 15 and which fits into a passage or cutout through the cell panel 12. The collector box 17 serves as a plenum for combustion gases and also collects condensed water that it receives from the condenser 16.

An inducer 18 is positioned on the front of the collector box 17 to receive the vent gases therefrom. The inducer has alternate vent gas discharge outlets 19, one of which is connected to a (not shown) vent pipe, and the other of which is closed off with an air-tight cap 20. The inducer is contained with an air-tight housing formed of a front housing half 21 and a housing half 22.

A gas valve 23 shown here in FIG. 1, meters and controls natural gas flow.

The remaining salient features of the furnace are shown in the exploded view of FIG. 2. Here a primary heat exchanger 24 consists of several parallel cells 25, each forming a serpentine path that leads into the condensers 16 of the condenser heat exchanger element 15. A burner box 26 contains several gas burners 27 that receive gas feed from the valve 23. The burners 27 inject flame through respective openings 28 so that hot combustion products pass through the primary heat exchanger 24 and condenser heat exchanger 15 where the combustion products heat circulation air that passes over the condensers 16 and cells 25.

A circulation blower 29 disposed below the heat exchanger element 15 forces comfort-space circulation air through the heat exchanger compartment 13 in a well known manner, and the heated circulation air returns through conventional ductwork (not shown) to the comfort space.

Figure 3:
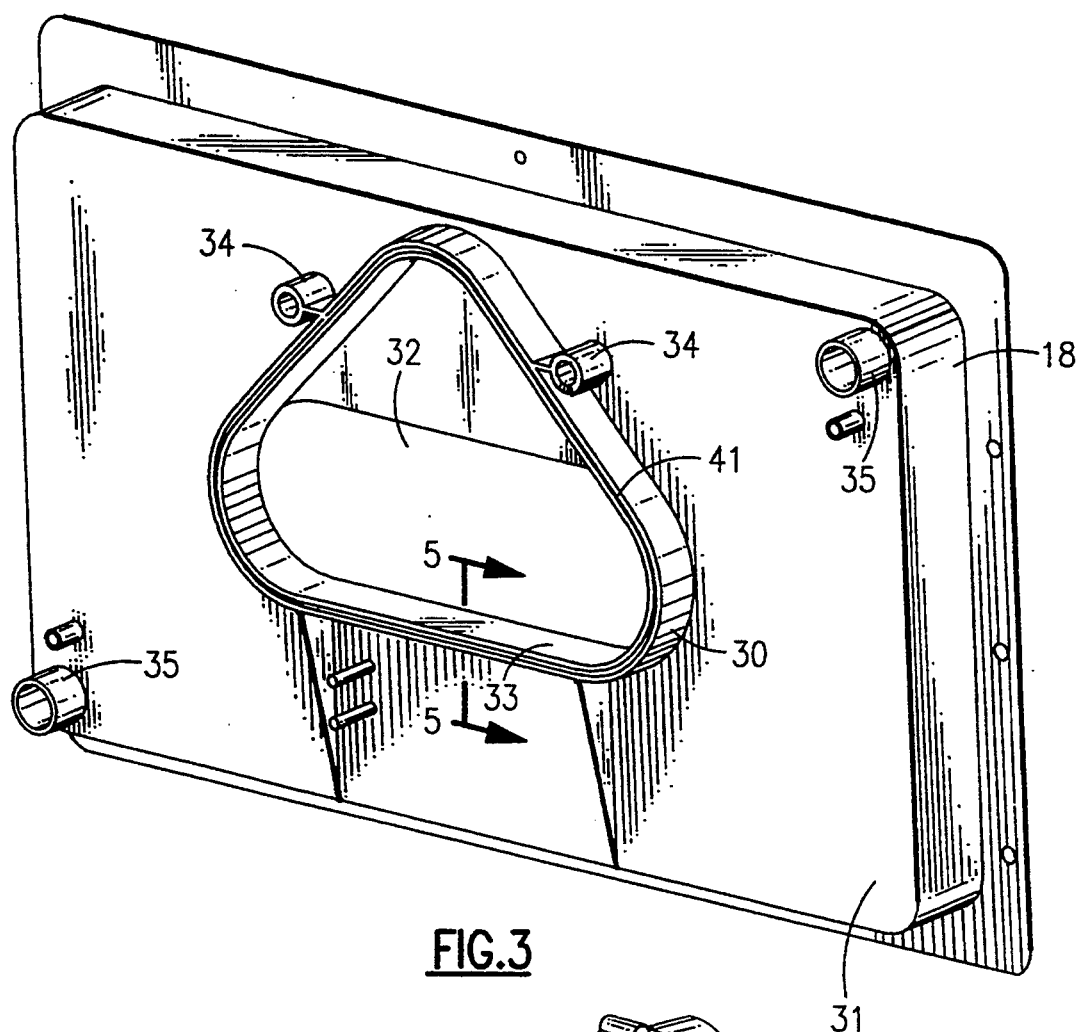
FIG. 3 is a perspective view of a collector box for the condensing heat exchanger element, showing a collector box sealing skirt disposed on a front side thereof.

As shown in FIG. 2 and in more detail in FIG. 3, there is a generally triangular sealing skirt 30 formed on a front wall 31 of the collector box 17, here surrounding a vent gas discharge port 32. This port 32 is in the form of a transversely elongated opening. The skirt 30 has a lower side wall 33 that extends adjacent a lower edge of the port opening 32, and there is a rounded apex above this wall. A pair of locator pin receptacles or sockets 34 are positioned adjacent the skirt 30.

Also shown on the collector box 17 are drain nipples 35 disposed at opposite corners of the collector box front wall 31. These nipples 35 permit drainage from the box 17 in any of the upflow, downflow, or sideflow poises of the furnace.

Figure 4:
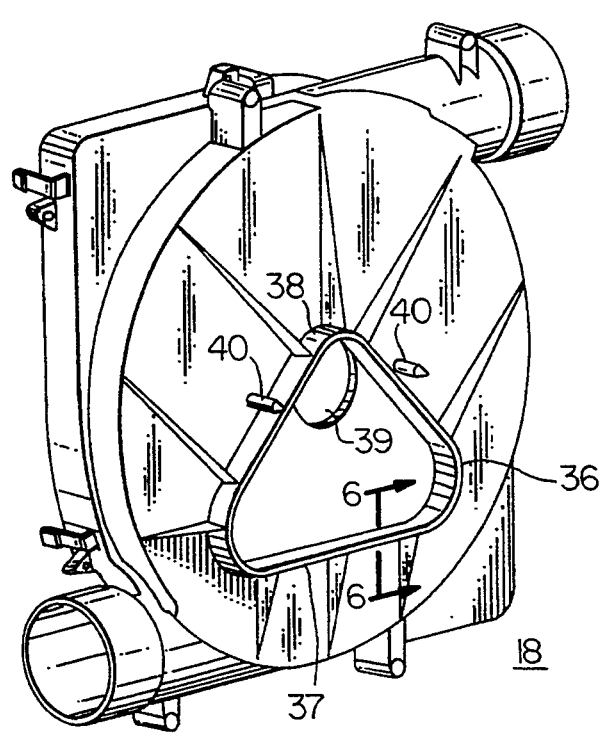
FIG. 4 is a perspective view of an inducer fan showing an inducer sealing skirt formed on its housing rear surface.

As shown in FIG. 4, the inducer 18 has a triangular sealing skirt 36 formed on its back housing wall 22. This sealing skirt 36 is the same size and shape as the skirt 30 so that the two match and engage one another. A lower wall 37 of the inducer skirt 36 aligns with the lower wall 33 of the collector box skirt 30. An arcuate apex 38 opposite the lower wall 37 bends around a central intake opening 39 in the inducer housing back wall. A pair of locator pins 40,40 positioned adjacent the skirt 36 enter the respective receptacles 34 and align the two sealing skirts 30 and 36 for sealing engagement with one another.

Figure 5:
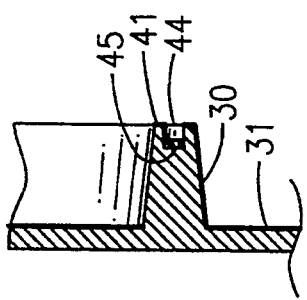
FIG. 5 is a cross section of the collector box skirt, taken at 5—5 of FIG. 3.
Figure 6:
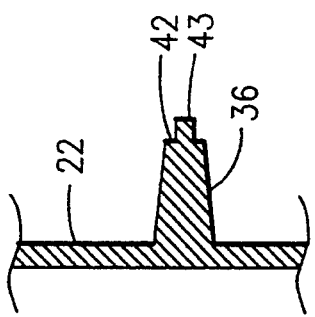
FIG. 6 is a cross section of the inducer sealing skirt, taken at 6—6 of FIG. 4.

As shown in FIGS. 5 and 6 respectively, each of the skirts 30 and 36 is in the form of a flange that projects out from the collector box wall 31 or inducer housing wall 22. The skirts continue entirely around both the elongated discharge port openings 32 and the round intake opening 39. The skirts 30 and 36 have respective tip edges 41 and 42 that mate together.

The inducer skirt 36 has a lip 43 that projects forward from the tip edge 42 and extends continuously around the skirt. The collector box skirt 30 has a mating groove 44 on its tip edge 41 that extends around the entire skirt and receives the lip 43 when the two sealing skirts 30,36 are joined. A quantity of a sealing compound 45 can be installed in the groove 44 before the inducer is positioned on the collector box, so that the two skirts 30 and 36 form an airtight gasketless seal.

The airflow from the collector box to the inducer is smooth and unimpeded, and does not require more than about one-inch (two and one-half centimeters) of spacing between collector box and inducer.

The triangular configuration provides other advantages in addition to off set. More specifically, the triangular shape, which is open at each apex, always permits condensate to drain out into either the collector box or the inducer housing. The condensate is not trapped in the seal in any of the poises, and drains into the collector box in the upflow, right flow and left flow poises, or into the inducer in the downflow poise.

For other embodiments, the sealing skirts can have shapes other than the generally triangular profile depicted here, depending on the overall design requirements of the furnace.

Also, the lip could be formed on either of the two skirts, with the mating groove being formed on the other skirt.

While this invention has been described with reference to a preferred embodiment, the invention is not limited to that precise embodiment. Rather, many modifications and variations would present themselves to those skilled in the art without departing from the scope and spirit of this invention, as defined in the appended claims.

What is claimed is:

1. In an induction type furnace in which an inlet of an inducer fan housing is coupled to an outlet of a heat exchanger element and wherein said inducer fan housing has a substantially planar back wall in which said inlet is centrally disposed and said heat exchanger element has a front wall disposed parallel to said inducer housing back wall and spaced a predetermined short distance therefrom with said heat exchanger element outlet being disposed in said front wall, the improvement, wherein said heat exchanger element outlet and said inducer fan housing inlet is positionally offset from one another and comprising a sealing arrangement surrounding said inlet and said outlet for fluidly and sealably coupling the heat exchanger element to the inducer fan housing and permitting passage of vent gases from said heat exchanger element into said inducer fan housing inlet; the sealing arrangement including first and second congruent continuous skirts each projecting from a respective one of said heat exchanger element front wall and said inducer fan housing back wall and surrounding the associated one of said outlet and said inlet, each said skirt having a tip edge; said first and second skirts mating at associated tip edges thereof, and including means on the respective tip edges to form a gasketless seal therebetween.

2. The sealing arrangement of claim 1 wherein said means on the respective tip edges includes a projecting male lip that extends continuously around one of the skirts on the top edge thereof, and a female groove that extends entirely around the other of the skirts on the tip edge thereof to receive the male lip of the one skirt to form said gasketless seal.

3. The sealing arrangement of claim 1 wherein said first and second skirts are of generally triangular shape.

4. The sealing arrangement of claim 3 wherein said heat exchanger element outlet is in the form of a transversely elongated opening, and the first skirt has a lower wall adjacent a lower edge of the transversely elongated opening.

5. The sealing arrangement of claim 4 wherein said second skirt has a lower wall that mates in register with the first skirt lower wall, and an upper apex opposite the lower wall and adjacent said inducer fan inlet.

6. The sealing arrangement of claim 1 wherein said heat exchanger element outlet is disposed centrally in said front wall.

* * * * *